United States Patent [19]
Hase et al.

[11] Patent Number: 5,765,049
[45] Date of Patent: Jun. 9, 1998

[54] OPTICAL APPARATUS HAVING LENS SYSTEM CHANGE-OVER MECHANISM

[75] Inventors: Hiroyuki Hase; Akihiro Namai, both of Kanagawa-ken, Japan

[73] Assignee: Canon Kabushiki Kaisha

[21] Appl. No.: 665,878

[22] Filed: Jun. 19, 1996

[51] Int. Cl.[6] .................. G02B 15/02; G03B 17/00
[52] U.S. Cl. .................. 396/73; 359/675
[58] Field of Search .................. 396/73, 74, 75; 359/672, 673, 674, 675

[56] References Cited

U.S. PATENT DOCUMENTS

| | | | |
|---|---|---|---|
| 4,214,829 | 7/1980 | Ohashi | 396/73 |
| 4,482,228 | 11/1984 | Fujita | 396/73 |
| 4,525,050 | 6/1985 | Ohashi | 396/75 |
| 4,536,068 | 8/1985 | Kodaira | 396/75 |
| 4,725,864 | 2/1988 | Ogawa et al. | 396/73 |
| 4,887,107 | 12/1989 | Nakamura et al. | 396/75 |
| 5,005,038 | 4/1991 | Ogawa et al. | 396/75 |
| 5,086,312 | 2/1992 | Tanaka et al. | 396/75 |
| 5,548,446 | 8/1996 | Enomoto | 359/695 |

FOREIGN PATENT DOCUMENTS 7-183485  6/1995  Japan .

Primary Examiner—David M. Gray
Assistant Examiner—J. K. Han
Attorney, Agent, or Firm—Robin, Blecker & Daley

[57] ABSTRACT

An optical apparatus includes an optical unit which is arranged to be inserted into and retracted from an optical path, a fixed tube, and a restricting member which is disposed at the fixed tube and restricts a position of the optical unit in a direction of an optical axis thereof when the optical unit is in a state of being inserted into the optical path.

20 Claims, 4 Drawing Sheets

OPTICAL APPARATUS HAVING LENS SYSTEM CHANGE-OVER MECHANISM

BACKGROUND OF THE INVENTION

1. Field of the Invention

This invention relates to an improvement of an optical apparatus capable of changing the focal length by inserting and retracting an optical means into and from an optical path.

2. Description of the Related Art

Heretofore, there have been proposed various optical systems of the kind having an auxiliary lens change-over mechanism arranged to change, for photographing, the focal length of the entire system between a long focal length and a short focal length by inserting and retracting an auxiliary lens system into and from an optical path of a photo-taking lens (a main lens system).

The change-over mechanism is mainly composed of a change-over means for inserting and retracting the auxiliary lens system into and from the optical path of the main lens system and a locking means for setting the position of the auxiliary lens system in the direction of an optical axis when the auxiliary lens system is inserted into the optical path. The change-over means and the locking means of the change-over mechanism are attached to a camera body or attached to a moving tube of a lens barrel.

However, the auxiliary lens system change-over mechanism having the locking means provided on the camera body has presented a problem in that it is impossible to guarantee the adequateness of operation and optical performance of a lens barrel unit before the lens barrel unit is mounted on the camera body and in that the change-over mechanism also makes the structural arrangement of a lens barrel complex.

The auxiliary lens system change-over mechanism having the locking means provided on the moving tube of the lens barrel has presented another problem in that it is extremely difficult to accurately insert the auxiliary lens system in a predetermined position within the optical path of the main lens system and, therefore, it has been difficult to keep the optical performance adequate.

SUMMARY OF THE INVENTION

In accordance with one aspect of this invention, there is provided an optical apparatus comprising an optical unit which is arranged to be inserted into and retracted from an optical path, a fixed tube, and a restricting member which is disposed at the fixed tube and restricts a position of the optical unit in a direction of an optical axis thereof when the optical unit is in a state of being inserted into the optical path, so that it is possible to guarantee the adequateness of optical performance and operating performance and also to permit improvement in assembly work and simplification of the structural arrangement.

The above and other aspects and features of this invention will become apparent from the following detailed description of a preferred embodiment thereof taken in connection with the accompanying drawings.

DETAILED DESCRIPTION OF THE PREFERRED EMBODIMENT

A preferred embodiment of this invention is described in detail below with reference to the drawings.

Figure 1:
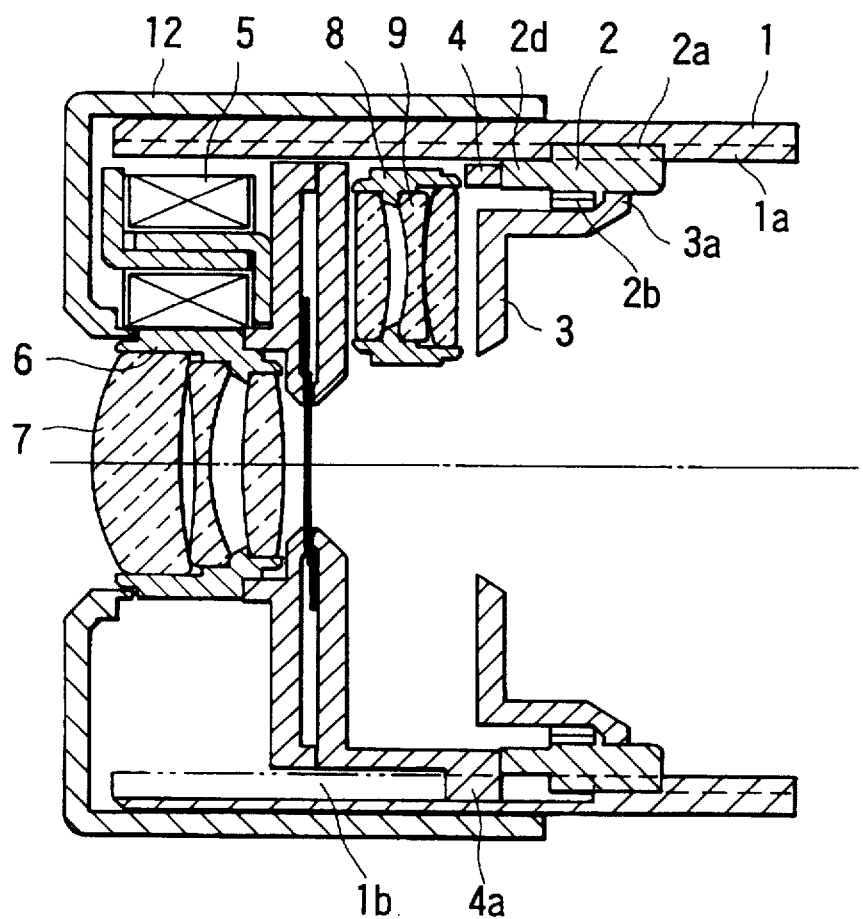
FIG. 1 is a sectional view showing an optical apparatus, according to an embodiment of this invention, when the optical apparatus is in a state of having a short focal length in which an auxiliary lens frame is retracted from the optical path of a main photo-taking lens system.
Figure 2:
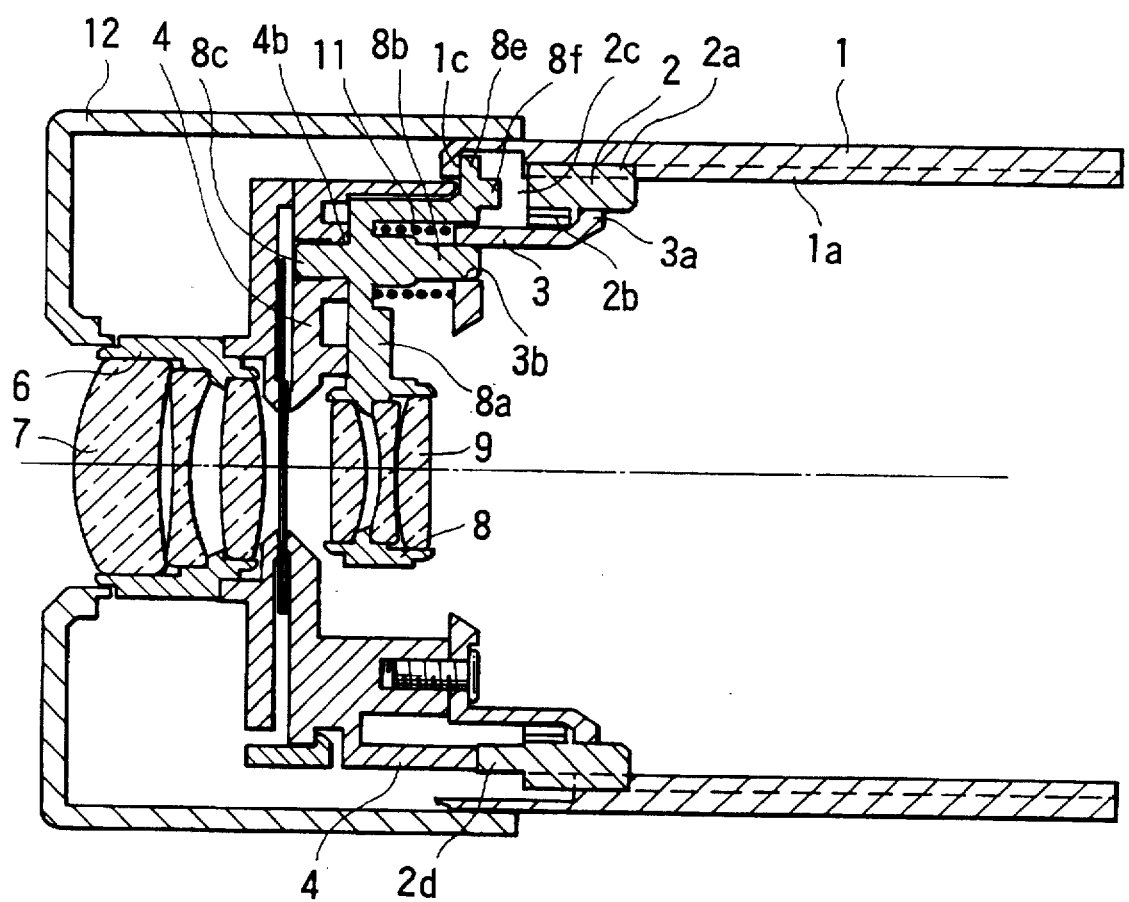
FIG. 2 is a sectional view showing the optical apparatus of FIG. 1 when the optical apparatus is in a state of having a long focal length in which the auxiliary lens frame is inserted into the optical path of the main photo-taking lens system.
Figure 3:
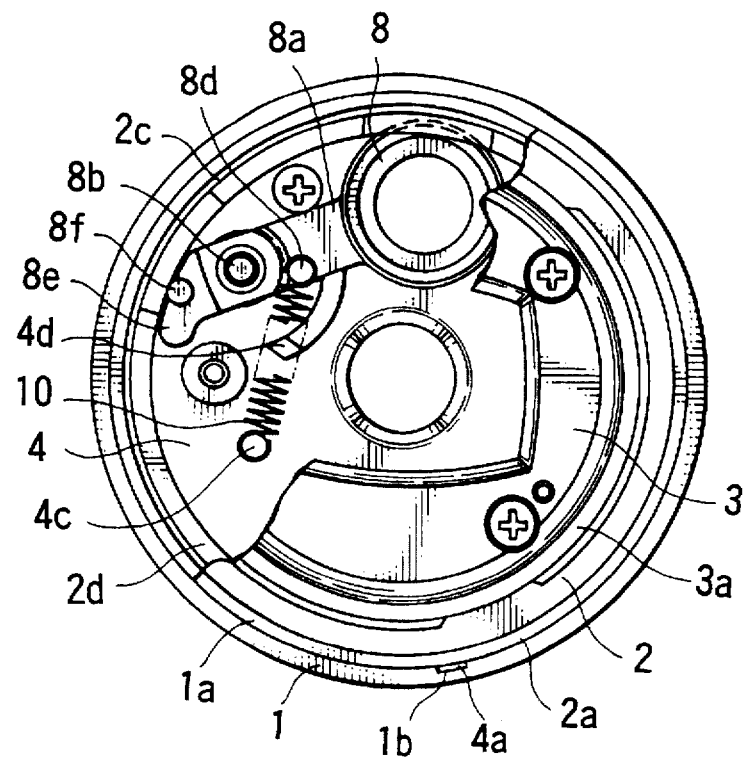
FIG. 3 is a rear view of the optical apparatus showing the auxiliary lens frame as viewed from behind in the state shown in FIG. 1.
Figure 4:
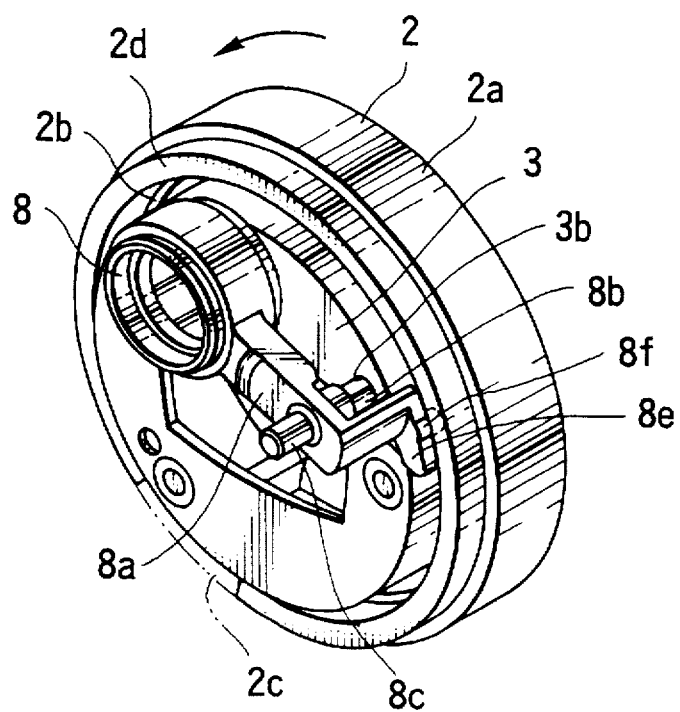
FIG. 4 is an oblique view showing a relation obtained between the auxiliary lens frame and a rotating tube when the optical apparatus is in the state shown in FIG. 1.
Figure 5:
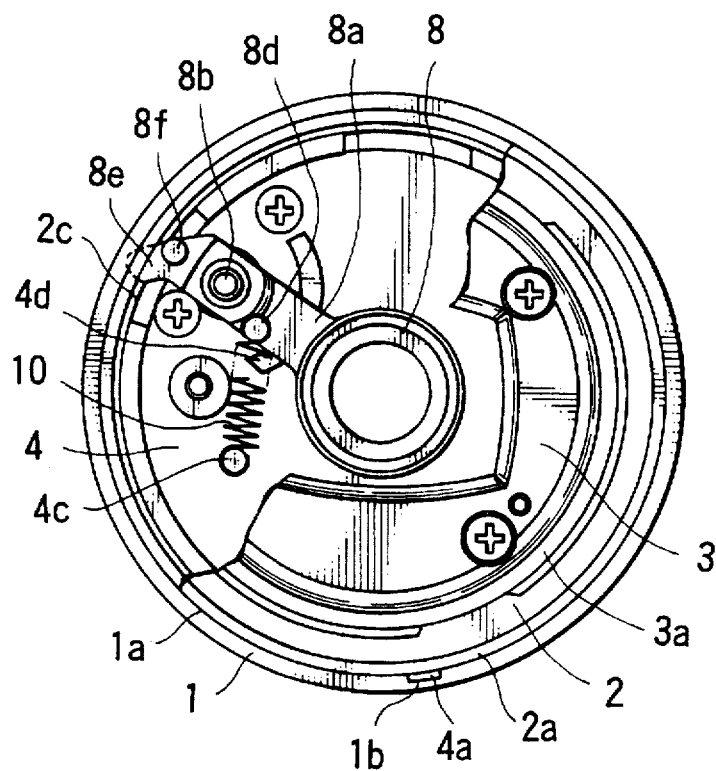
FIG. 5 is a rear view of the optical apparatus showing the auxiliary lens frame as viewed from behind in the state shown in FIG. 2.
Figure 6:
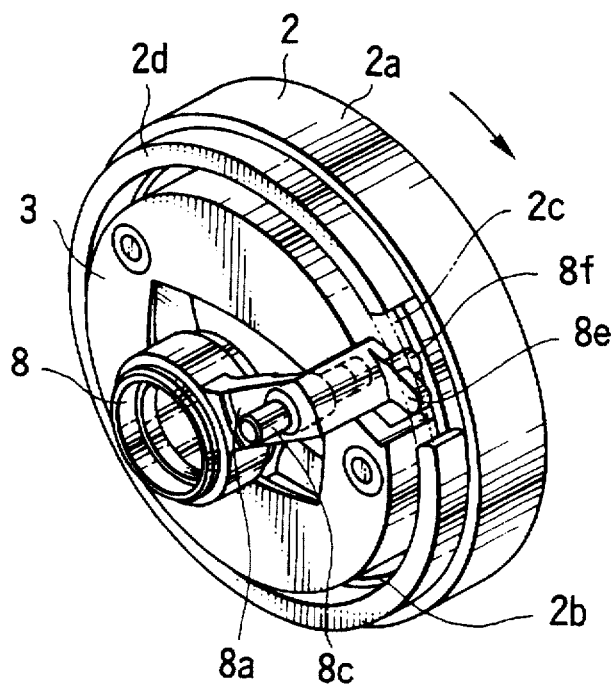
FIG. 6 is an oblique view showing a relation obtained between the auxiliary lens frame and the rotating tube when the optical apparatus is in the state shown in FIG. 2.

FIGS. 1 to 6 illustrate the essential parts of the optical apparatus according to the embodiment of this invention. Of these drawings, FIG. 1 shows in a sectional view the optical apparatus in a state in which the focal length of the entire system is at a short focal length obtained when an auxiliary lens frame 8 is retracted from the photo-taking optical path of a main photo-taking lens system 7. FIG. 2 shows in a sectional view the optical apparatus in a state in which the focal length of the entire system is at a long focal length obtained when the auxiliary lens frame 8 is inserted into the photo-taking optical path of the main photo-taking lens system 7. FIG. 3 is a rear view showing a part of a lens barrel as viewed from behind in the state of FIG. 1. FIG. 4 shows in an oblique view a relation between the auxiliary lens frame 8 and a rotating tube 2 obtained in the state of FIG. 1. FIG. 5 is a rear view showing a part of the lens barrel as viewed from behind in the state of FIG. 2. FIG. 6 shows in an oblique view a relation between the auxiliary lens frame 8 and the rotating tube 2 obtained in the state of FIG. 2.

Referring to FIGS. 1 to 6, a fixed tube 1 is fixedly secured with screws to a camera body which is not shown. The fixed tube 1 has various parts arranged on its inner circumferential side, including a helicoid screw 1a, a rectilinear groove 1b for allowing photo-taking optical systems (a main lens system 7 and an auxiliary lens system 9) to linearly move in the direction of an optical axis, and a stopper (locking means) 1c arranged to set the position of the auxiliary lens frame 8 in the direction of the optical axis when the entire system is in a state of having a long focal length in which the auxiliary lens frame 8 is inserted into the optical path.

A rotating tube 2 is rotatably fitted on the periphery of a flange part 3a of a rear base plate 3 which will be described later herein. A helicoid screw 2a, which is formed on the outer circumferential side of the rotating tube 2, engages the helicoid screw 1a of the fixed tube 1. A gear 2b is formed on the inner circumferential side of the rotating tube 2 and is interlocked with a lens barrel driving system (not shown) which includes a motor. The lens barrel driving system is arranged to cause the rotating tube 2 to rotate along the periphery of the flange part 3a of the rear base plate 3 in such a way as to move back and forth in the direction of the optical axis along the helicoid screw 1a of the fixed tube 1.

A front part of the rotating tube 2 is provided with a rib 2d (holding means) arranged to support a shutter unit 5 and the photo-taking optical systems in the direction of the optical axis and having a cutout part (change-over means) 2c arranged to cause the auxiliary lens frame 8 to be retracted from or inserted into the photo-taking optical path of the main lens system 7 (main photo-taking lens system). The rear base plate 3 is fixedly secured to a blade retainer 4 with screws. The periphery of the rear base plate 3 is provided with the flange part 3a, which is arranged to have the rotating tube 2 rotatably fitted and supported thereon in cooperation with the blade retainer 4. The planar part of the rear base plate 3 is provided with a shaft hole 3b formed to have a shaft 8b of the auxiliary lens frame 8 rotatably fitted and supported therein in such a way as to permit the shaft 8b to be movable back and forth therethrough.

The blade retainer 4 is fixedly secured to the shutter unit 5 with screws and is supported by the fore end of the rib 2d of the rotating tube 2 in the direction of the optical axis. On the periphery of the blade retainer 4, there is formed a protruding part 4a which is slidably fitted into the rectilinear groove 1b formed in the fixed tube 1. The blade retainer 4 is thus arranged to be linearly movable in the direction of the optical axis along the rectilinear groove 1b. The planar part of the blade retainer 4 is provided with a shaft hole 4b formed to have a shaft 8c of the auxiliary lens frame 8 rotatably fitted and supported therein in such a way as to be movable back and forth, a shaft 4c having a tension spring 10 hooked thereon, and a stopper 4d formed to set the position of the auxiliary lens frame 8 in the direction orthogonal to the optical axis.

The shutter unit 5 contains therein a known shutter driving system and the lens barrel driving system (not shown). A main lens frame 6 is arranged to hold the main photo-taking lens system (main lens system) 7 and is held by the shutter unit 5. The auxiliary lens frame 8 is arranged to hold an auxiliary lens system 9, and is provided with an L-shaped arm 8a, the support shafts 8b and 8c which are formed before and behind the L-shaped arm 8a, and a shaft 8d arranged to have the tension spring 10 (elastic member) hooked thereon.

The support shafts 8b and 8c are rotatably fitted and supported in the shaft hole 3b of the rear base plate 3 and the shaft hole 4b of the blade retainer 4, respectively, in such a way to be movable back and forth. The auxiliary lens frame 8 is thus arranged to be retracted from and inserted into the photo-taking optical path of the main photo-taking lens system 7 by rotating on the support shafts 8b and 8c. A lock part 8e is formed at a fore end of the arm 8a to be locked by the stopper 1c of the fixed tube 1 when the entire system is in a state of having the long focal length. A shaft 8f is mounted on the lock part 8e to cause the auxiliary lens frame 8 to be retracted from the photo-taking optical path of the main photo-taking lens system 7 by abutting on the inner circumferential side of the rib 2d of the rotating tube 2 and to keep the auxiliary lens frame 8 in the retracted position.

The tension spring 10 is arranged to urge the auxiliary lens frame 8 to move clockwise, i.e., in the direction of entering the photo-taking optical path of the main photo-taking lens system 7. One end of the tension spring 10 is hooked on the shaft 4c of the blade retainer 4 and the other end is hooked on the shaft 8d of the auxiliary lens frame 8. A compression spring (elastic member) 11 is disposed between the rear base plate 3 and the auxiliary lens frame 8 to push the auxiliary lens frame 8 forward for stabilizing a spacing distance between the main photo-taking lens system 7 and the auxiliary lens system 9 when the entire system is in a state of having the long focal length. A lens barrel cover 12 covers the photo-taking optical systems, the shutter unit 5 and the lens barrel driving system (not shown) and consitutes a moving tube.

According to the embodiment configured as described above, the focal length of the entire system is changed from a short focal length over to a long focal length by inserting the auxiliary lens system 8 into the optical path of the main photo-taking lens system 7. Specifically, the state of FIG. 1 is changed over to the state of FIG. 2 by causing the rotating tube 2 to rotate counterclockwise along the periphery of the flange part 3a of the rear base plate 3 by means of the lens barrel driving system (not shown). At this time, the rotating tube 2 moves while pushing the blade retainer 4 (the shutter unit 5 and the photo-taking optical systems 7 and 9) forward along the helicoid screw 1a of the fixed tube 1.

Since the protruding part 4a of the blade retainer 4 is slidably fitted in the rectilinear groove 1b of the fixed tube 1, the shutter unit 5 and the photo-taking optical systems 7 and 8 linearly move in the direction of the optical axis along the rectilinear groove 1b. At that time, since the shaft 8f which is provided on the lock part 8e of the auxiliary lens frame 8 is abutting on the inner circumferential side of the rib 2d of the rotating tube 2, as shown in FIG. 4, the auxiliary lens frame 8 moves forward while retaining its state of having been retracted from the photo-taking optical path of the main photo-taking lens system 7.

When the rotating tube 2 is still moving before reaching a long focal length position of the entire system, the cutout part 2c which is provided in the rib 2d of the rotating tube 2 rotates to reach the position of the shaft 8f of the auxiliary lens frame 8, as shown in FIG. 6. Then, the cutout part 2c brings the auxiliary lens frame 8 into a free state to allow the auxiliary lens frame 8 to be rotated clockwise on the support shafts 8b and 8c by the spring force of the tension spring 10 which has been charged. The auxiliary lens system frame 8 is thus caused to enter the photo-taking optical path of the main photo-taking lens system 7. At this time, as shown in FIG. 5, the arm 8a of the auxiliary lens frame 8 comes to abut on the stopper 4d which is provided on the blade retainer 4, so that the position of the auxiliary lens frame 8 in the direction orthogonal to the optical axis is determined.

After that, the rotating tube 2 further rotates until the lock part 8e of the auxiliary lens frame 8 is locked by the stopper 1c of the fixed tube 1. The position of the auxiliary lens frame 8 in the direction of the optical axis is thus determined to bring the entire system into the state of having the long focal length as shown in FIG. 2.

When the focal length of the entire system is changed from the long focal length over to the short focal length, the lens barrel driving system (not shown) causes the rotating tube 2 to rotate clockwise on the periphery of the flange part 3a of the rear base plate 3 from the state of FIG. 2. The rotating tube 2 is thus caused to move along the helicoid screw 1a of the fixed tube 1 while pushing the flange part 3a of the rear base plate 3 backward. Since the protruding part 4a of the blade retainer 4 is slidably fitted in the rectilinear groove 1b of the fixed tube 1, the shutter unit 5 and the photo-taking optical systems 7 and 8 linearly move in the direction of the optical axis along the groove 1b.

At this time, the auxiliary lens frame 8 which has entered the photo-taking optical path of the main photo-taking lens system 7 comes to have the shaft 8f of the lock part 8e pushed by the rib 2d of the rotating tube 2. The pushing force causes the auxiliary lens frame 8 to rotate counterclockwise on the support shafts 8b and 8c while charging the tension spring 10. After that, the shaft 8f of the auxiliary lens frame 8 abuts on the inner circumferential side of the rib 2d of the rotating tube 2, as shown in FIG. 4. The rib 2d thus keeps the auxiliary lens frame 8 in a state of having been retracted from the photo-taking optical path of the main photo-taking lens system 7. The focal length of the entire system thus becomes a short focal length, as shown in FIG. 1.

As described above, according to the embodiment, the rotating tube 2 which moves the photo-taking optical systems 7 and 8 in the direction of the optical axis is provided with the rib 2d (holding means) having the cutout part 2c (change-over means) arranged to cause the auxiliary lens frame 8 to be retracted from or inserted into the photo-taking optical path of the main photo-taking lens system 7 and to keep the auxiliary lens frame 8 in the retracted state. The change-over between the long focal length and the short focal length is carried out by means of the rib 2d to cause the shaft 8f of the auxiliary lens frame 8 to directly respond to the rotation of the rotating tube 2. Further, the fixed tube 1 which is fixedly secured to the camera body (not shown) and engages the helicoid screw 2a of the rotating tube 2 is provided with the stopper 1c (locking means) arranged to lock the auxiliary lens frame 8 in a position in the direction of the optical axis. These parts ensure the adequate operation and the adequate optical performance of the optical apparatus even before the lens barrel unit thereof is mounted on the camera body. Further, according to the arrangement of the embodiment described, the auxiliary lens frame 8 can be reliably retracted from the photo-taking optical path of the main photo-taking lens system 7.

The embodiment described above is provided with the holding means for holding the auxiliary lens frame at a predetermined position within the lens barrel, the change-over means for causing the auxiliary lens frame to be inserted into and retracted from the optical path of the main lens system with the auxiliary lens frame driven, and the locking means for locking the auxiliary lens frame in a predetermined position in the direction of the optical axis. With these parts adequately set, the auxiliary lens can be accurately inserted and set at the predetermined position within the optical path of the main lens system and also can be quickly retracted from the optical path. Therefore, in accordance with this invention, a lens barrel can be arranged to have an auxiliary lens system change-over mechanism which is capable of adequately changing the focal length of the entire system between a long focal length and a short focal length.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Further, the individual components shown in schematic or block form in the drawings are all well-known in the camera arts and their specific construction and operation are not critical to the operation or best mode for carrying out the invention.

The invention may be carried out by combining as necessary the embodiment or its technological elements described in the foregoing.

The invention applies to cases where either the whole or a part of claims or the arrangement of the embodiment described forms one apparatus or is used in combination with some other apparatus or as a component element of an apparatus.

Further, the invention is applicable to cameras of varied kinds, such as a single-lens reflex camera, a lens-shutter type camera, a video camera, etc., optical apparatuses other than cameras, devices adapted for cameras, optical apparatuses and other apparatuses, and components forming these apparatuses and devices.

What is claimed is:

1. An optical apparatus comprising:
   a) an optical unit which is arranged to be inserted into and retracted from an optical path;
   b) a fixed tube; and
   c) a restricting member which restricts a position of said optical unit in a direction of an optical axis thereof and which restricts said optical unit in a state of being inserted into the optical path, said restricting member being disposed on said fixed tube.

2. An optical apparatus according to claim 1, wherein said optical unit includes a lens unit for changing a focal length.

3. An optical apparatus according to claim 1, further comprising a moving device which moves said optical unit in the direction of the optical axis thereof.

4. An optical apparatus according to claim 1, further comprising a rotating tube which is rotatable with respect to said fixed tube, said rotating tube having an inserting-and-retracting part which causes said optical unit to be inserted into and retracted from the optical path.

5. An optical apparatus according to claim 1, further comprising a rotating tube which is rotatable with respect to said fixed tube, said rotating tube having an inserting-and-retracting portion which causes said optical unit to be inserted into and retracted from the optical path and a holding portion which holds said optical unit in a state of being retracted from the optical path.

6. An optical apparatus according to claim 1, further comprising a rotating tube which is rotatable with respect to said fixed tube, said rotating tube having a holding portion which holds said optical unit in a state of being retracted from the optical path.

7. An optical apparatus according to claim 1, further comprising a moving tube which is movable with respect to said fixed tube, said moving tube having a restricting portion which restricts a position of said optical unit in a direction in which said optical unit is inserted into the optical path, when said optical unit is in the state of being inserted into the optical path.

8. An optical apparatus according to claim 7, further comprising an elastic member which urges said optical unit to move in the direction in which said optical unit is inserted into the optical path.

9. An optical apparatus according to claim 1, further comprising an elastic member which urges said optical unit to move in the direction in which said optical unit is inserted into the optical path.

10. A camera comprising:
    a) an optical unit which is arranged to be inserted into and retracted from an optical path;
    b) a fixed tube; and
    c) a restricting member which restricts a position of said optical unit in a direction of an optical axis thereof and which restricts said optical unit in a state of being inserted into the optical path, said restricting member being disposed on said fixed tube.

11. A camera according to claim 10, wherein said optical unit includes a lens unit for changing a focal length.

12. A camera according to claim 10, further comprising a moving device which moves said optical unit in the direction of the optical axis thereof.

13. A camera according to claim 10, further comprising a rotating tube which is rotatable with respect to said fixed tube, said rotating tube having an inserting-and-retracting part which causes said optical unit to be inserted into and retracted from the optical path.

14. A camera according to claim 10, further comprising a rotating tube which is rotatable with respect to said fixed tube, said rotating tube having an inserting-and-retracting portion which causes said optical unit to be inserted into and retracted from the optical path and a holding portion which holds said optical unit in a state of being retracted from the optical path.

15. A camera according to claim 10, further comprising a rotating tube which is rotatable with respect to said fixed tube, said rotating tube having a holding portion which holds said optical unit in a state of being retracted from the optical path.

16. A camera according to claim 10, further comprising a moving tube which is movable with respect to said fixed tube, said moving tube having a restricting portion which restricts a position of said optical unit in a direction in which said optical unit is inserted into the optical path, when said optical unit is in the state of being inserted into the optical path.

17. A camera according to claim 16, further comprising an elastic member which urges said optical unit to move in the direction in which said optical unit is inserted into the optical path.

18. A camera according to claim 10, further comprising an elastic member which urges said optical unit to move in the direction in which said optical unit is inserted into the optical path.

19. An optical apparatus comprising:

a) an optical unit which is arranged to be inserted into and retracted from an optical path;

b) a fixed tube; and c) restricting means for restricting a position of said optical unit in a direction of an optical axis thereof and which restricts said optical unit in a state of being inserted into the optical path, said restricting means being disposed on said fixed tube.

20. A camera comprising:

a) an optical unit which is arranged to be inserted into and retracted from an optical path;

b) a fixed tube; and c) restricting means for restricting a position of said optical unit in a direction of an optical axis thereof and which restricts said optical unit in a state of being inserted into the optical path, said restricting means being disposed on said fixed tube.

* * * * *

UNITED STATES PATENT AND TRADEMARK OFFICE
CERTIFICATE OF CORRECTION

PATENT NO. : 5,765,049
DATED : June 9, 1998
INVENTOR(S) : Hase, et al.

It is certified that error appears in the above-identified patent and that said Letters Patent is hereby corrected as shown below:

On the title page, item [30], insert the following:

Foreign Application Priority Data
Jun. 26, 1995 [JP]   Japan..........7-183485

Signed and Sealed this

Nineteenth Day of January, 1999

Attest:

Attesting Officer

*Acting Commissioner of Patents and Trademarks*